(12) United States Patent
Zhang et al.

(10) Patent No.: US 12,061,597 B2
(45) Date of Patent: Aug. 13, 2024

(54) METHOD AND APPARATUS FOR HIERARCHICALLY PRUNING DATA IN BLOCKCHAIN TRANSACTION, DEVICE AND MEDIUM

(71) Applicant: University of Science and Technology of China, Hefei (CN)

(72) Inventors: Wenshuai Zhang, Hefei (CN); Jing Li, Hefei (CN)

(73) Assignee: UNIVERSITY OF SCIENCE AND TECHNOLOGY OF CHINA, Hefei (CN)

( * ) Notice: Subject to any disclaimer, the term of this patent is extended or adjusted under 35 U.S.C. 154(b) by 0 days.

(21) Appl. No.: 18/543,440

(22) Filed: Dec. 18, 2023

(65) Prior Publication Data

US 2024/0168942 A1   May 23, 2024

Related U.S. Application Data

(63) Continuation of application No. PCT/CN2022/090567, filed on Apr. 29, 2022.

(30) Foreign Application Priority Data

Jun. 18, 2021 (CN) .......................... 202110682927.8

(51) Int. Cl.
*G06F 16/00* (2019.01)
*G06F 16/22* (2019.01)
*G06F 16/23* (2019.01)

(52) U.S. Cl.
CPC ...... *G06F 16/2365* (2019.01); *G06F 16/2255* (2019.01)

(58) Field of Classification Search
CPC .......................... G06F 16/2365; G06F 16/2255
See application file for complete search history.

(56) References Cited

U.S. PATENT DOCUMENTS

| 11,379,472 B2 * | 7/2022 | Irazabal ................... G06F 16/27 |
| 2020/0092084 A1 * | 3/2020 | Maroney ................ H04L 9/3239 |
| 2022/0271960 A1 * | 8/2022 | Liu ........................ H04L 9/3297 |
| 2023/0179423 A1 * | 6/2023 | Lee ........................ H04L 9/3247 |
| | | 713/168 |

FOREIGN PATENT DOCUMENTS

CN             110727644 A         1/2020

* cited by examiner

*Primary Examiner* — Cheryl Lewis
(74) *Attorney, Agent, or Firm* — WPAT, P.C

(57) ABSTRACT

The present disclosure provides a method for hierarchically pruning data in a blockchain transaction, which comprises: acquiring a transaction data set; performing N rounds of pruning on the transaction data set based on a data pruning model to obtain a target data set; and performing processing on the target data set to obtain a target value, wherein the target value is configured as the transaction identification number used when the target data set is on-chain. Based on the customized data pruning model, part of the data in the transaction (e.g., Unlocking-Scripts and Locking-Scripts) can be easily pruned in the process of network transmission, internal storage, or construction of a new transaction (especially the Unlocking-Scripts therein) without affecting the process of verifying the data of other parts of the transaction data, which significantly improves the efficiency of UTXO-based blockchains.

18 Claims, 7 Drawing Sheets

METHOD AND APPARATUS FOR HIERARCHICALLY PRUNING DATA IN BLOCKCHAIN TRANSACTION, DEVICE AND MEDIUM

REFERENCE TO RELATED APPLICATION

The present application claims priority to Chinese Patent Application No. 202110682927.8 filed to China National Intellectual Property Administration on Jun. 18, 2021 and entitled "METHOD AND SYSTEM FOR HIERARCHICALLY PRUNING DATA IN BLOCKCHAIN TRANSACTION, AND STORAGE MEDIUM", the entire content of which is incorporated herein by reference.

TECHNICAL FIELD

The present disclosure belongs to the technical field of blockchain, and particularly relates to a method and an apparatus for hierarchically pruning data in a blockchain transaction, a device and a medium.

BACKGROUND

The blockchain technology is a technology for a distributed ledger, and is also a technology in which a plurality of ledger maintenance nodes distributed at different geographic positions jointly participate in accounting and record transaction data to a distributed database. The ledger maintenance node is a node that runs compatible similar accounting software and may become an accounting node. Transaction data may be defined as an accounting data unit that is individual and functionally complete and is transmitted between all ledger maintenance nodes. Each accounting is implemented by broadcasting or point-to-point sending a transaction to a distributed network by a user, adding the transaction into a ledger database by accounting nodes selected according to a consensus rule, and finally verifying the transaction by other ledger maintenance nodes.

In the network, there are nodes that do not participate in accounting, but still record complete or partial, historical or current transaction data, which may be referred to as ledger synchronization nodes. There are further some user nodes in the network that only store transaction data related to the user or the user group, or also store the most basic block header data, which are referred to as light nodes. In particular, in the present disclosure, the "blockchain" is used only for simplifying the description, and the meaning thereof is not limited to the narrowly defined blockchain network, but includes all forms of distributed ledgers, in which the accounting transactions are not necessarily packaged into one block, and can be added into the distributed ledger in a relatively separation manner.

In the existing blockchain technology, the main data in a transaction is hashed as a whole to obtain the transaction identification number TXID. When a node needs to use hash calculation to verify the authenticity of part of the transaction data in the transaction, the complete transaction data pointed by the TXID must be received, so that the storage, transmission and secondary utilization costs of the transaction data are increased, and unnecessary user burden is increased.

SUMMARY

In order to at least partially solve the problem described above, the present disclosure provides a method and an apparatus for hierarchically pruning data in a blockchain transaction, an electronic device, a storage medium, and a program product.

According to one aspect of the present disclosure, provided is a method for hierarchically pruning data in a blockchain transaction, which includes: acquiring a transaction data set; performing N rounds of pruning on the transaction data set based on a data pruning model to obtain a target data set, where N is a positive integer greater than or equal to 1; and processing the target data set to obtain a target value, wherein the target value is the transaction identification number used when the target data set is on-chain.

According to an embodiment of the present disclosure, the performing N rounds of pruning on the transaction data set based on a data pruning model to obtain a target data set includes: S1, constructing a reserved data set and M pruned data sets by using the transaction data set, where M is a positive integer greater than or equal to 1; S2, performing first serialization encoding on the pruned data set to obtain a first serialization encoded value corresponding to the pruned data set; S3, performing hash calculation on the first serialization encoded value to obtain a first hash value corresponding to the first serialization encoded value; S4, constructing a first hash value set by M first hash values corresponding to first serialization encoded values, and merging the first hash value set with the reserved data set to obtain an intermediate transaction data set; and S5, repeatedly executing operations S1-S4 by using the intermediate transaction data set until the intermediate transaction data set satisfies a predetermined condition to obtain the target data set.

According to another aspect of the present disclosure, provided is an apparatus for hierarchically pruning data in a blockchain transaction, which includes: an acquisition module, configured to acquire a transaction data set; a pruning module, configured to perform N rounds of pruning on the transaction data set based on a data pruning model to obtain a target data set, wherein N is a positive integer greater than or equal to 1; a processing module, configured to perform processing on the target data set to obtain a target value, wherein the target value is configured as the transaction identification number used when the target data set is on-chain.

According to another aspect of the present disclosure, provided is an electronic device including: one or more processors; a storage apparatus, configured to store one or more programs, wherein the one or more programs, when executed by the one or more processors, cause the one or more processors to perform the method for hierarchically pruning data in a blockchain transaction described above.

According to another aspect of the present disclosure, provided is a computer-readable storage medium having executable instructions stored thereon, wherein the instructions, when executed by a processor, cause the processor to perform the method for hierarchically pruning data in a blockchain transaction described above.

According to another aspect of the present disclosure, provided is a computer program product including a computer program, wherein the computer program, when executed by a processor, implements the method for hierarchically pruning data in a blockchain transaction described above.

DETAILED DESCRIPTION

Hereinafter, embodiments of the present disclosure will be described with reference to the accompanying drawings. It should be understood that these descriptions are exemplary only and are not intended to limit the scope of the present disclosure. In the following detailed description, for purposes of explanation, numerous specific details are set forth in order to provide a thorough understanding of the embodiments of the present disclosure. It may be obvious, however, that one or more embodiments may be practiced without these specific details. Moreover, in the following description, descriptions of well-known structures and techniques are omitted so as to not unnecessarily obscure the concepts of the present disclosure.

The terminology used herein is to describe specific embodiments only and is not intended to be limiting of the present disclosure. The terms "includes", "contains" and the like used herein indicate the presence of features, steps, operations and/or components, but do not preclude the presence or addition of one or more other features, steps, operations or components.

All terms (including technical and scientific terms) used herein have the meanings commonly understood by those skilled in the art, unless otherwise defined. It should be noted that the terms used herein should be interpreted as having a meaning that is consistent with the context of the present specification and should not be interpreted in an idealized or overly rigid manner.

Where an expression such as "at least one of A, B, C and the like" is used, it should generally be interpreted as those skilled in the art would generally understand the expression (for example, "a system having at least one of A, B and C" would include but not be limited to systems that have A alone, B alone, C alone, A and B, A and C, B and C, and/or A, B and C).

In the technical schemes of the present disclosure, the processes of data acquisition, collection, storage, use, processing, transmission, provision, disclosure, application and the like all comply with relevant laws and regulations, have taken necessary confidentiality measures, and do not violate public order and good customs.

Figure 1:
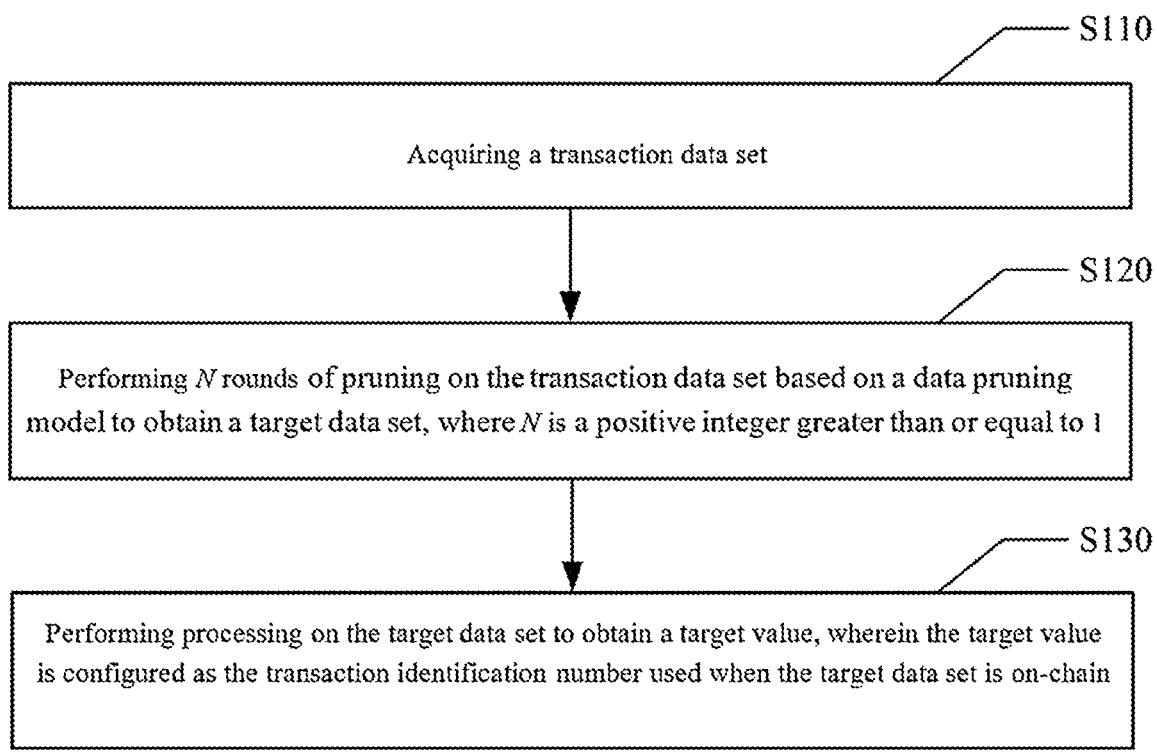
FIG. 1 is a flow chart schematically illustrating a method for hierarchically pruning data in a blockchain transaction according to an embodiment of the present disclosure.

FIG. 1 is a flow chart schematically illustrating a method for hierarchically pruning data in a blockchain transaction according to an embodiment of the present disclosure.

As shown in FIG. 1, the method 100 includes operations S110-S130.

In operation S110, a transaction data set is acquired.

In operation S120, N rounds of pruning are performed on the transaction data set based on a data pruning model to obtain a target data set, where N is a positive integer greater than or equal to 1.

According to an embodiment of the present disclosure, when the method is applied to a distributed ledger under a UTXO model, in the case of different numbers of transaction data inputs and transaction data outputs, the pruning round N may be determined according to an actual pruning requirement, and after the specific pruning round is determined, the pruning operation is performed on the transaction data set. The pruning round N may be unaffected by the number of transaction data inputs and transaction data outputs, that is, the pruning round N may not depend on the number of transaction data inputs and transaction data outputs.

According to an embodiment of the present disclosure, the mode of the number of the pruning levels is determined by determining the pruning round, which is conducive to simplifying the implementation of relevant software codes, and is also conducive to implementing code hardware for the pruning method of the present application.

According to an embodiment of the present disclosure, a transaction data set may be a set of complete transaction data propagated in a distributed ledger network, wherein the transaction data may be represented by $X^0$. The set of complete transaction data may include all necessary transaction data elements, and does not necessarily include partially redundant data. The necessary data may be data required when transaction validity is verified by a ledger maintenance node. For example, the Unlocking Script Size data or the Locking Script Size data are also redundant data, and may be data that are not required to be verified by the ledger maintenance node. According to an embodiment of the present disclosure, the transaction data set $X^0$ may be formed by combining a plurality of segments of data, for example, which may be represented by formula (1):

$$X^0 = \{x_1, x_2, x_3, \ldots, x_n\} \quad (1)$$

where $x_1$, $x_2$, $x_3$, ..., $x_n$ are data elements in the transaction data set, where n is the number of the data elements in the transaction data set.

According to an embodiment of the present disclosure, a data set obtained after each round of pruning is performed on a transaction data set through the data pruning model F, for example, may be represented by formula (2):

$$Y = S \cup \{HASH(binW_1), HASH(binW_2), \ldots, HASH(binW_M)\} \quad (2)$$

where S is a reserved data set in an input data set X; $W_1$, $W_2$, ..., $W_M$ are pruned data sets in the input data set X; M is the number of the pruned data sets; $binW_M$ is a serialization encoded value of the pruned data set $W_M$, $HASH(binW_M)$ is a hash value of the $binW_M$, Y is a data set obtained after the input data set X is pruned by the data pruning model; wherein X, S and $W_h$, for example, may be represented by formula (3):

$$X = \{x_1, x_2, x_3, \ldots, x_a\}; S = \{s_1, s_2, s_3, \ldots, s_b\}; W_h = \{w_{h,1}, w_{h,2}, w_{h,3}, \ldots, w_{h,c_h}\} \quad (3)$$

where $W_h$ is any one of the pruned data sets $W_1$, $W_2$, ..., $W_M$; a is the number of data elements in the input data set X, and $x_1$, $x_2$, $x_3$, ..., $x_a$ are the data elements in the input data set X; b is the number of data elements in the reserved data set S (b≥0), and $s_1$, $s_2$, $s_3$, ..., $s_b$ are the data elements in the reserved data set S; h is the number of the pruned data sets, where $1 \leq h \leq M$; $c_h$ is the number of data elements in the pruned data set $W_h$, where $c_h \geq 1$, and $w_{h,1}$, $w_{h,2}$, $w_{h,3}$, ..., $w_{h,c_h}$ are data elements in the pruned data set $W_h$.

According to an embodiment of the present disclosure, optionally, an input data set may be set as formula (4):

$$X = S \cup W_1 \cup W_2 \cup \ldots \cup W_M \qquad (4)$$

In formula (4), the input data set X represents a union of the reserved data set S and the pruned data sets W1, W2, . . . , WM to reduce redundant data.

According to an embodiment of the present disclosure, optionally, the input data set may also be set as formula (5):

$$X = S + W_1 + W_2 + \ldots + W_M, a = b + c_1 + c_2 + \ldots + c_M, M + 1 \leq a \qquad (5)$$

According to an embodiment of the present disclosure, the input data set X is represented in the form of the formula (5), so as to avoid data duplication and improve data pruning efficiency.

It should be noted that, in an embodiment of the present disclosure, for example, HASH(p) represents a hash value obtained after performing one or more nested hash calculations on data p; a hash value obtained by performing one hash calculation on data p is represented by hash(p), and hash values obtained by performing r nested hash calculations on data p are represented by $HASH_r(p)$, where $HASH_r(p) = hash(HASH_{r-1}(p))$, $r \geq 1$, $HASH_0(p) = p$.

The hash in hash($HASH_{r-1}(p)$) represents a hash function used in the $r^{th}$ hash calculation, and the hash function may be any one hash function or a newly designed function with equivalent efficacy. $HASH_r(p)$ consists of r arbitrary hash function nests, wherein the r hash functions may be different or the identical.

According to an embodiment of the present disclosure, for example, the serialization encoding operation on any one data set R is denoted as Encoded(R), and the output data after the encoding operation is binary data, which can be denoted as binR or bin(R), where bin(R)=binR=Encode(R). Some constant data and consensus rules can be added to the encoding operation to meet specific search and decode requirements. The encoding operation may be any one transforming operation with a method of inverse decoding operation (denoted as Decode), i.e. with the property R=Decode(Encode(R)).

According to an embodiment of the present disclosure, the performing N rounds of pruning on the transaction data set based on a data pruning model F may include: pruning data elements in the transaction data set to form a pruned data set, performing serialization encoding and hash calculation on the pruned data set, retaining an unpruned data set, and merging a hash set composed of hash values of the pruned data and the reserved unpruned data set, so as to form a target data set.

Figure 2:
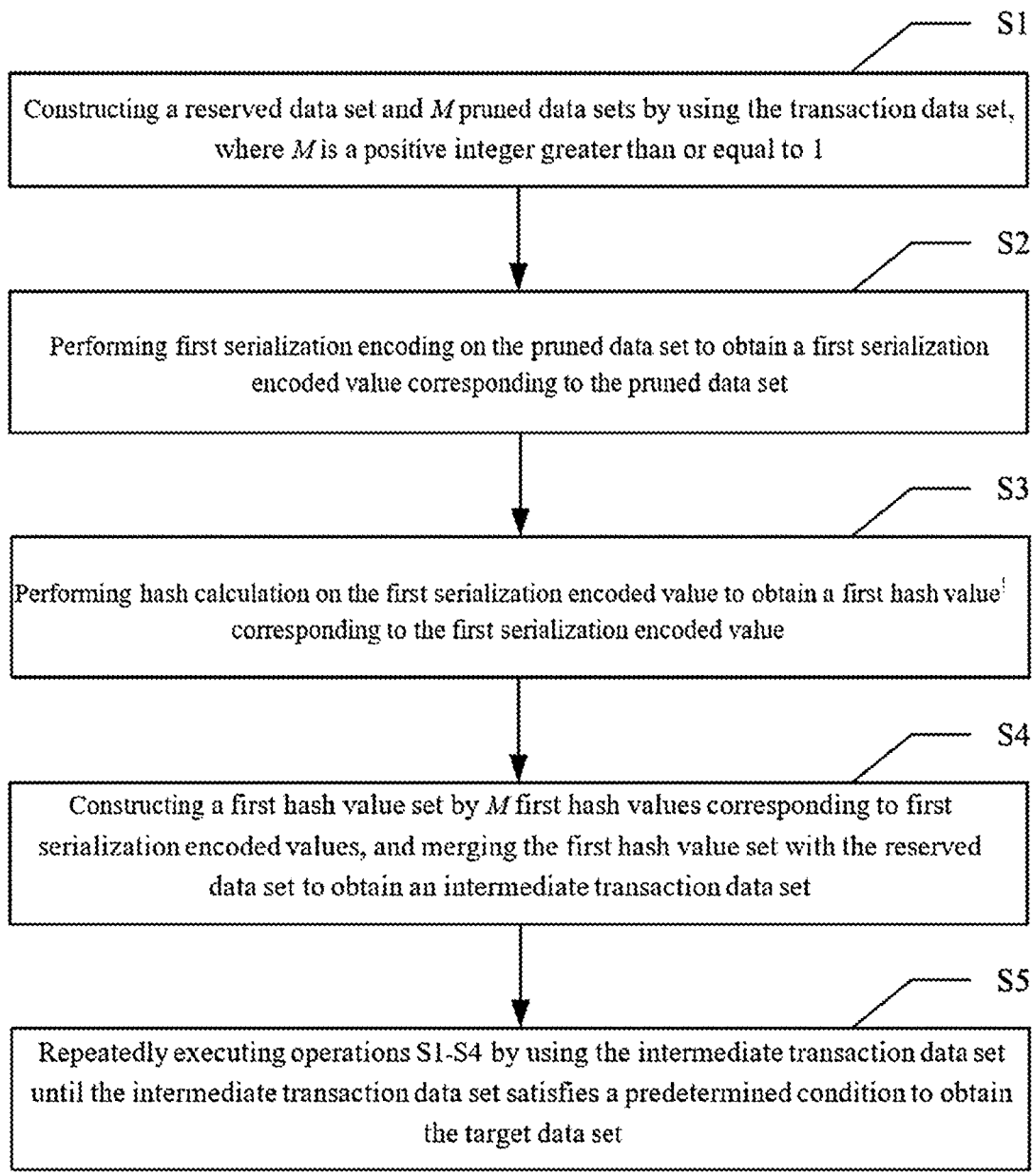
FIG. 2 is a flow chart schematically illustrating a method for obtaining a target data set by N rounds of pruning transaction data according to an embodiment of the present disclosure.

For example, FIG. 2 is a flow chart schematically illustrating a method for obtaining a target data set by N rounds of pruning transaction data according to an embodiment of the present disclosure.

As shown in FIG. 2, the method 200 further includes operations S1-S5.

In operation S1, a reserved data set and M pruned data sets are constructed by using the transaction data set, where M is a positive integer greater than or equal to 1.

In operation S2, first serialization encoding is performed on the pruned data set to obtain a first serialization encoded value corresponding to the pruned data set.

In operation S3, the hash calculation is performed on the first serialization encoded value to obtain a first hash value corresponding to the first serialization encoded value.

In operation S4, a first hash value set is constructed from the M first hash values corresponding to the first serialization encoded values, and is merged with the reserved data set to obtain an intermediate transaction data set.

In operation S5, the operations S1-S4 are looped by using the intermediate transaction data set until the intermediate transaction data set satisfies a predetermined condition to obtain the target data set.

According to an embodiment of the present disclosure, when a transaction data set is used as an input data set to be subjected to the first round of pruning, the transaction data set $X^0 = \{x_1, x_2, x_3, \ldots, x_n\}$ may be partitioned into transaction data that does not need to be pruned and transaction data that could be pruned during the current round of pruning according to a data partitioning rule. The transaction data that does not need to be pruned is used to construct a data set, which is called a reserved data set $S^0$, and the transaction data that can be pruned is used to construct a plurality of data sets, which is called pruned data sets $W_1^0$, $W_2^0$, . . . , $W_{M0}^0$, M0 is the number of pruned data sets when the pruned data sets are in the first round of pruning, and M is a positive integer greater than 1.

According to an embodiment of the present disclosure, the transaction data set $X^0$ is partitioned into a reserved data set $S^0$ and M pruned data sets $W_1^0$, $W_2^0$, $W_{M0}^0$, which can be represented by: $X^0 = S^0 + W_1^0 + W_2^0 + \ldots W_{M0}^0$, which can also be represented by formula (6):

$$X^0 = S^0 \cup W_1^0 \cup W_2^0 \cup \ldots \cup W_{M0}^0 \qquad (6)$$

According to an embodiment of the present disclosure, the reserved data set in the first round of pruning may be a non-empty data set.

According to an embodiment of the present disclosure, when the first round of data pruning is performed on the M pruned data sets through data pruning model F, that is, performing the first serialization encoding and the hash calculation may include: performing first serialization encoding on the $l^{th}$ pruned data set $W_l^0$ to obtain a binary first serialization encoded value $binW_l^0$, where $1 \leq l \leq M$, and performing hash calculation on the first serialization encoded value $binW_l^0$ to obtain a hash pointer $hashW_l^0$ of the data set $W_l^0$, i.e., a first hash value corresponding to the first serialization encoded value of the data set $hashW_l^0 = HASH(binW_l^0)$.

According to an embodiment of the present disclosure, after the first serialization encoding, the hash calculation is performed on the M pruned data sets to obtain M first hash value sets corresponding to the first serialization encoded values of the corresponding pruned data sets, wherein the hash value sets may be represented by formula (7):

$$\{HASH(binW_1^0), HASH(binW_2^0), \ldots HASH(binW_l^0), \ldots, HASH(binW_{M0}^0)\} \qquad (7)$$

According to an embodiment of the present disclosure, the hash value set corresponding to the first round of pruning is merged with the reserved data set $S^0$ to obtain an intermediate transaction data set $Y^0$, i.e., the transaction data $X^1$ obtained after performing the first round of pruning on the transaction data set $X^0$ through the data pruning model F, for example, which may be represented by formula (8):

$$X^1 = Y^0 = S^0 \cup \{HASH(binW_1^0), HASH(binW_2^0), \ldots HASH(binW_l^0), \ldots, HASH(binW_{M0}^0)\} \qquad (8)$$

According to an embodiment of the present disclosure, the intermediate transaction data set $Y^0$ ($X^1$) is used as an input data set to perform the above operations S1-S4 to obtain an intermediate transaction data set $Y^i$, that is, the transaction data $X^{i+1}$ after performing the i+1$^{th}$ round of pruning on the transaction data set $X^0$ through the data pruning model F, and the transaction data set $Y^i$ is used as a target data set $X^N$ when the intermediate transaction data set $Y^i$ satisfies a predetermined condition, where $1 \leq i \leq N-1$. The intermediate transaction data set $Y^i$ obtained after the i+1$^{th}$ round of pruning may be represented by formula (9):

$$X^{i+1} = Y^i = S^i \cup \{HASH(binW_1^i), HASH(binW_2^i), \ldots HASH(binW_1^0), \ldots, HASH(binW_{Mi}^i)\} \quad (9)$$

It should be noted that, when data pruning is performed on the transaction data set or the intermediate transaction data set through the data pruning model F, each round of data pruning process is independent, that is, M0, M1, . . . Mi, . . . , M(N−1) are all independent constants.

According to an embodiment of the present disclosure, the process of performing N rounds of pruning on the transaction data set $X^0$ may be represented by formula (10):

$$\begin{cases} Y^i = F(X^i) = S^i \cup \{HASH(binW_1^i), HASH(binW_2^i), \ldots, HASH(binW_{Mi}^i)\} \\ X^{i+1} = Y^i \\ 0 \leq i \leq N-1 \end{cases} \quad (10)$$

where $X^{i+1}$ represents the data of the transaction data set $X^0$ after the i+1$^{th}$ layer of pruning in the data pruning model F; $X^i$ is an input data set of the data pruning model F in the i+1$^{th}$ round of pruning; $Y^i$ is an output data set of the data pruning model F in the i+1$^{th}$ round of pruning; $S^i$ is a reserved data set of $X^i$ after the i+1$^{th}$ layer of pruning; $W_1^i, W_2^i, \ldots W_{Mi}^i$ are pruned data sets of $X^i$ in the i+1$^{th}$ round of pruning, wherein Mi is the number of the pruned data sets that needed to be subjected to data pruning in the i+1$^{th}$ round of pruning; $S^i = \{s_1^i, s_2^i, s_3^i, \ldots, s_{bi}^i\}$, wherein $b_i$ is the number of data elements in the reserved data set in the i+1$^{th}$ round of pruning; the h$^{th}$ pruned data set in the i+1$^{th}$ round of pruning may be represented by $W_h^i = \{W_{h,1}^i, W_{h,2}^i, \ldots, W_{h,c_{i,h}}^i\}$ data set, wherein $W_h^i$ is any one of the pruned data sets $W_1^i, W_2^i, \ldots W_M^i$ in the i+1$^{th}$ round of pruning, and $c_{i,h}$ is the number of data elements in $W_h^i$.

According to an embodiment of the present disclosure, a round of pruning is performed on the transaction data, the transaction data set is added with one layer of hash pointer, and the number of the reserved data set and the pruned data set in each round of pruning process is changed due to the difference of the number of input data and the number of output data in the transaction.

According to an embodiment of the present disclosure, output data pruned in the intermediate round, such as HASH(bin$W_1^i$), HASH(bin $W_2^i$), . . . , HASH [bin$W_{M^i i}^i$], may not be stored in the node, but may be obtained again by temporary calculating other data when needed, so as to reduce data storage pressure.

According to an embodiment of the present disclosure, the M pruned data sets in the transaction data sets are partitioned in the same round of pruning process, so that the separate hashing and encoding of different transaction data in the M pruned data sets are implemented, which facilitates the subsequent tracing and decoding of the transaction data. For example, the input data and the output data in the same round of hashing are separately packed and encoded, which facilitates the data decoding and verification.

In operation S130, the target data set is processed to obtain a target value, wherein the target value is configured as the transaction identification number used when the target data set is on-chain.

According to an embodiment of the present disclosure, the performing processing on the target data set to obtain a target value may include: performing second serialization encoding on the target data set to obtain a second serialization encoded value corresponding to the target data set; and performing hash calculation on the second serialization encoded value to obtain a target value.

According to an embodiment of the present disclosure, second serialization encoding is performed on the target data set $X^N$ to obtain a second serialization encoded value bin$X^N$ corresponding to the target data set $X^N$, and the hash calculation is performed on the second serialization encoded value bin$X^N$ to obtain a target hash value HASH(bin$X^N$), wherein the target hash value is the obtained target value and is configured as the transaction identification number used when the target data set is on-chain.

According to an embodiment of the present disclosure, the transaction identification number obtained by the method may be referred to as a structured indexed transaction identification number.

According to an embodiment of the present disclosure, before the transaction data set is pruned, especially when the transaction data set is transmitted between the blockchain maintenance nodes, the format of the original transaction data transmitted can be kept unchanged, and the currently existing format of transaction can be adopted to be compatible with the current software and application environment.

According to an embodiment of the present disclosure, the transaction data set contains all transaction data before the first round of pruning, the original data in the transaction data set is replaced by the data hash value in the second round and above of pruning process, traces of the original data always exist in the form of hash values in the data migration process, and tampering with any of the transaction data causes the set of transaction input data for each round of pruning to be changed to facilitate data traceability.

According to an embodiment of the present disclosure, by performing multi-layer hash processing on the transaction data set, each data in the transaction data set exists in a node corresponding to the transaction data set in a blockchain or a distributed network in a form of original data or hash encoding. In this way, it solves the technical problem that when a node or a transaction Locking Script needs to verify the authenticity of part of transaction data in the inputted data, the whole complete transaction data must be received, which increases the data volume required by the storage and transmission of the transaction data. Therefore, when the authenticity of part of transaction data needs to be verified, the TXID of the transaction data where the part of the transaction data is located and the hash values of other transaction data are utilized to implement the verification of the authenticity of the part of the transaction data, and the redundant data of the transaction data set may be reduced as needed during the migration process between nodes, so that the size of the data packet in the data transmission process is reduced, and repeated transmission of redundant data is avoided, thereby improving data transmission and processing efficiency. Meanwhile, in the data migration process, the data exists in the data node at least in the form of hash encoding, thereby ensuring data reliability verification and preventing data tampering. Moreover, the tracing of specified data is facilitated by hierarchical hashing of data, so that a user can download the data as required, and downloading of redundant data is avoided when the required data is obtained.

According to an embodiment of the present disclosure, for example, for a plurality of transaction outputs of a UTXO model, the users do not need to download or save the data contents of the transaction outputs that are not concerned by the users, but only download or save the hash values of these data contents as substitutes.

According to an embodiment of the present disclosure, in order to ensure hierarchical hashing of data and quick tracing of part of common data, $S^0 \neq \emptyset$ may be set. In a further implementation, it may also be set that when the hash pruning is performed on the data through the data pruning model F, in each layer of pruning process, the reversed data sets are not empty sets, that is, the reserved data set is a non-empty data set in operation S110.

According to an embodiment of the present disclosure, optionally, $S^j \subseteq S^{j-1}$, $1 \leq j \leq N-1$ ($s^i_k \in S^j$, $j<i$, $1 \leq k < b_i$), wherein $s^i_k$ is the $k^{th}$ data element in the reserved data set during the $i+1^{th}$ round of pruning, and $S^i$ is the reserved data set in the $j^{th}$ round of pruning. That is, when the hash pruning is performed on the transaction data set for the first time in the $j^{th}$ round of pruning process, the transaction data set exists in the reserved data set in the previous $j-1^{th}$ round of pruning process, so that data tracing is facilitated.

According to an embodiment of the present disclosure, in the process of performing hash pruning on data through the data pruning model F, any one pruned data set $W_h$ may include datum, and may further include data. That is, in an embodiment of the present disclosure, in the process of each round of data pruning, any one pruned data set $W_h$ may include datum, and may further include data. Therefore, a plurality of data are packed into a pruned data set for unified encoding and hash transformation, which reduces the workload and improves the working efficiency. Partitioning the pruned data set in the same layer of hash pruning implements the separate hash encoding of different types of data, which facilitates the subsequent tracing and decoding of the data.

According to an embodiment of the present disclosure, when the method is applied to a distributed ledger under a UTXO model, the transaction data set $X^0$ may include: a transaction version number Version, transaction time lock data LockTime, the number of transaction inputs Input-Count, all data elements included in the data TxIn of each transaction input, the number of transaction outputs Output-Count, and all data elements included in the data TxOut of each transaction output.

According to an embodiment of the present disclosure, all data elements included in the data TxIn of each transaction input are as follows: TXID, VOUT, Unlocking Script Size, Unlocking Script and Sequence data, wherein TXID designates a preamble transaction corresponding to the input, VOUT designates a sequencing position of transaction output of the preamble transaction, the TXID and the VOUT together designate a position of output TxOut of the previous transaction spent by the input, and the Unlocking Script records an Unlocking Script required for spending the transaction output. All data elements included in the data TxOut output by each transaction are as follows: Value, Locking Script Size and Locking Script.

According to an embodiment of the present disclosure, optionally, when the method is applied to a distributed ledger under a UTXO model, in the case of the first round of pruning, an Unlocking Script element in each transaction input data in the transaction data set forms a separate pruned data set. In the case of the $j^{th}$ round of pruning, data elements related to the Unlocking Script elements in each transaction input data all belong to the same pruned data set, where $2 \leq j \leq N$.

According to an embodiment of the present disclosure, optionally, when the method is applied to a distributed ledger under a UTXO model, in the case of the first round of pruning, a Locking Script element in each transaction output data in the transaction data set forms a separate pruned data set. In the case of the $j^{th}$ round of pruning, data elements related to the Locking Script elements in the each transaction output data all belong to the same pruned data set, where $2 \leq j \leq N$.

According to an embodiment of the present disclosure, when the method is applied to a distributed ledger under a UTXO model, among all the data of transacting each input and output, only Unlocking Script Size and Locking Script Size data use the variable-length data format, and their byte length is not constant. Optionally, Unlocking Script data followed by each Unlocking Script Size and Locking Script data followed by each Locking Script Size data are partitioned into the same prunable data set, so that data related to the transaction input and output contents in the output data set after this pruning all have constant byte length, which is convenient for the rapid segmentation and parsing of transaction data.

According to an embodiment of the present disclosure, for example, the Unlocking Script Size data is the length measurement of the Unlocking Script data, and the Unlocking Script Size data can be deduced from the Unlocking Script data, so that the Locking Script size data may be not recorded in a transaction data set and may not participate in subsequent transaction identification number calculation; similarly, the Locking Script Size data may be not recorded in the transaction data set, and may also not participate in the subsequent transaction identification number calculation.

According to an embodiment of the present disclosure, in a distributed ledger under a UTXO model, Unlocking Script data in each transaction input is used to prove to the ledger maintenance node the validity of the transaction, and may include data from the previous transaction or other data that may result in a large transaction volume. After the transaction is validated and written to the distributed ledger database, the ledger maintenance node basically no longer needs the data. After the Unlocking Script data in each transaction input are separately hashed, the data content can be pruned as required in subsequent transaction scripts or node interaction, and only the hash value is reserved to verify the authenticity and the validity of other data in this transaction. Similarly, a Locking Script in each transaction output represents a spending condition for this transaction output, which may have the identical contents in different outputs of different transactions and is used for expressing the same transaction recipient or authenticating script code. The script may be of a large volume and used multiple times in some scenarios. By separately hashing the Locking Script of each output, on the one hand, the script can be proved to be the transaction output at a specific position in a certain transaction by only using the hash value of the script in the case of not giving out the complete content of the script, so that the size of the transaction script or the interactive data among nodes is reduced, and on the other hand, a plurality of transactions can share the part of transaction data through the same hash pointer, so that the storage space is saved.

According to an embodiment of the present disclosure, optionally, in a case that the transaction data set is determined to be in the $j^{th}$ round of pruning, a separate pruned data set is formed among any elements in each transaction input data in the transaction data set, and a separate pruned data set is formed among any elements in each transaction output data in the transaction data set, where $2 \leq j \leq N-1$.

According to an embodiment of the present disclosure, optionally, in any one of the second round and above of pruning, only two prunable data sets are set, wherein one data set is used for accommodating data elements related to the content of any one transaction input, and the other is used for accommodating data elements related to the content of any one transaction output. Redundant data may be reduced after the first round of pruning, and through the partition of the second round and above of two prunable data sets, input related data and output related data are processed separately, the situation that the prunable data sets are excessively partitioned is avoided, and data tracing is further facilitated.

According to an embodiment of the present disclosure, optionally, for example, when multiple rounds of pruning are performed on the transaction data set $X^0$ in a distributed ledger under a UTXO model, the transaction version number Version, the transaction time lock data LockTime, the number of transaction inputs InputCount, TXID, VOUT, and Sequence in each transaction input data TxIn, the number of transaction outputs OutputCount, and Value in each transaction output data TxOut all belong to the reserved data set $S^0$.

According to an embodiment of the present disclosure, optionally, when the first round of pruning is performed on the transaction data set $X^0$, a generalized hash calculation is performed on the Unlocking Script Size and Unlocking Script in the transaction input data TxIn in, and the Locking Script Size and Locking Script in the transaction output data TxOut to reduce redundant data. In a specific implementation, in the process of pruning, a reserved data set with any one of a transaction version number Version and transaction time lock data LockTime is represented by $S^g$, $G=S^0$-Version-LockTime, and a reserved data set with any one of data in the data set G is represented by $S^{g'}$, $g>g'$, i.e., $S^g \subseteq S^{g'}$. Therefore, the data node with the transaction version number Version and the transaction time lock data LockTime is closest to the root node on the blockchain, and identification of the two parts of data in the transaction is facilitated.

In the following, the method for uploading N rounds of pruned data to a chain applied to the blockchain will be described in detail in conjunction with three embodiments in a distributed ledger under a UTXO model. In the following embodiments, a BitcoinSatoshiVision (BSV) blockchain in bitcoin is taken as an example, but it should be understood by those skilled in the art that this does not limit the scope of the present invention, and the target blockchain of the embodiments may be other UTXO model blockchains with homogeneous transaction data elements including Bitcoin (BTC) blockchain, Dogecoin (DOGE) blockchain, Litecoin (LTC) blockchain, and Bitcoin Cash (BCH) blockchain.

For the convenience of illustration, the following three embodiments all use two-input two-output transactions, which may be transactions of any input number and any output number, as long as the implementation of the first two transaction inputs or transaction outputs is also applied to other transaction inputs or outputs.

Table 1 is the composition of the transaction data set $X^0$ in embodiments 1-3 below, which is as shown in Table 1.

TABLE 1

| Data composition | | Composition of transaction data set $X^0$ |
|---|---|---|
| Transaction data including a transaction version number Version | | $X_1$ = Version |
| Transaction time lock data LockTime | | $x_2$ = LockTime |
| Number of transaction inputs InputCount | | $x_3$ = InputCount |
| Number of transaction outputs OutputCount | | $x_4$ = OutputCount |
| Data TxIn of the first transaction input | TxIn1: TXID | $x_5$ = TxIn1: TXID |
| | TxIn1: VOUT | $x_6$ = TxIn1: VOUT |
| | TxIn1: Unlocking Script Size | $x_7$ = TxIn1: Unlocking Script Size |
| | TxIn1: Unlocking Script | $x_8$ = TxIn1: Unlocking Script |
| | TxIn1: Sequence | $x_9$ = TxIn1: Sequence |
| Data TxIn of the second transaction input | TxIn2: TXID | $x_{10}$ = TxIn2: TXID |
| | TxIn2: VOUT | $x_{11}$ = TxIn2: VOUT |
| | TxIn2: Unlocking Script Size | $x_{12}$ = TxIn2: Unlocking Script Size |
| | TxIn2: Unlocking Script | $x_{13}$ = TxIn2: Unlocking Script |
| | TxIn2: Sequence | $x_{14}$ = TxIn2: Sequence |
| Data TxOut of the first transaction output | TxOut1: Value | $x_{15}$ = TxOut1: Value |
| | TxOut1: Locking Script Size | $x_{16}$ = TxOut1: Locking Script Size |
| | TxOut1: Locking Script | $x_{17}$ = TxOut1: Locking Script |
| Data TxOut of the second transaction output | TxOut2: Value | $x_{18}$ = TxOut2: Value |
| | TxOut2: Locking Script Size | $x_{19}$ = TxOut2: Locking Script Size |
| | TxOut2: Locking Script | $x_{20}$ = TxOut2: Locking Script |

Embodiment 1

Figure 3:
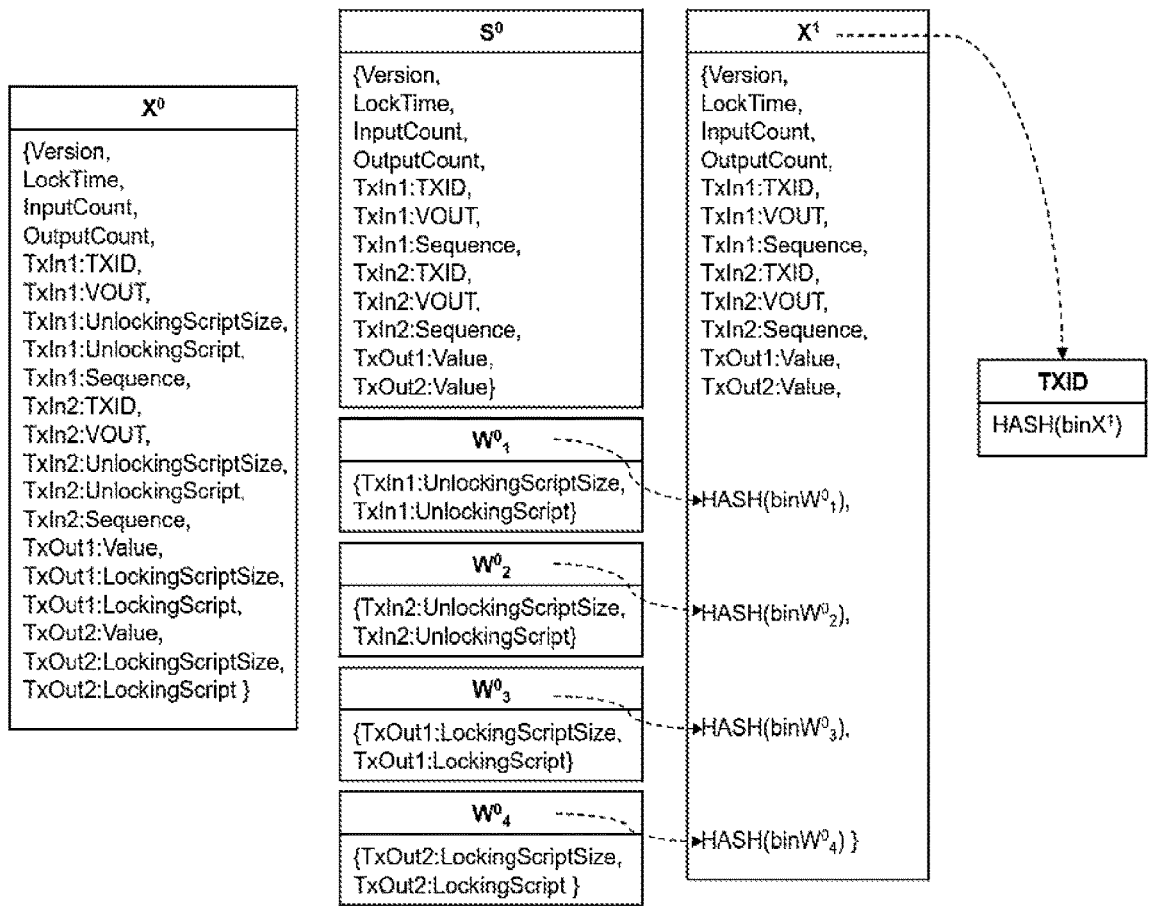
FIG. 3 schematically shows a transaction data set partitioning diagram according to embodiment I of the present disclosure.

In this embodiment, a round of pruning is performed on the transaction data set $X^0$ in Table 1, and in the process of pruning, a reserved data set S and a pruned data set Ware partitioned as shown in Table 2 and FIG. 3.

TABLE 2

| $X^0$ | $S^0$ | $W^0_1$ | $W^0_2$ | $W^0_3$ | $W^0_4$ |
|---|---|---|---|---|---|
| $x_1$ = Version | $x_1$ | | | | |
| $x_2$ = LockTime | $x_2$ | | | | |
| $x_3$ = InputCount | $x_3$ | | | | |
| $x_4$ = OutputCount | $x_4$ | | | | |
| $x_5$ = TxIn1: TXID | $x_5$ | | | | |
| $x_6$ = TxIn1: VOUT | $x_6$ | | | | |
| $x_7$ = TxIn1: Unlocking Script Size | | $x_7$ | | | |
| $x_8$ = TxIn1: Unlocking Script | | $x_8$ | | | |
| $x_9$ = TxIn1: Sequence | $x_9$ | | | | |
| $x_{10}$ = TxIn2: TXID | $x_{10}$ | | | | |
| $x_{11}$ = TxIn2: VOUT | $x_{11}$ | | | | |
| $x_{12}$ = TxIn2: Unlocking Script Size | | | $x_{12}$ | | |
| $x_{13}$ = TxIn2: Unlocking Script | | | $x_{13}$ | | |
| $x_{14}$ = TxIn2: Sequence | $x_{14}$ | | | | |
| $x_{15}$ = TxOut1: Value | $x_{15}$ | | | | |
| $x_{16}$ = TxOut1: Locking Script Size | | | | $x_{16}$ | |
| $x_{17}$ = TxOut1: Locking Script | | | | $x_{17}$ | |
| $x_{18}$ = TxOut2: Value | $x_{18}$ | | | | |
| $x_{19}$ = TxOut2: Locking Script Size | | | | | $x_{19}$ |
| $x_{20}$ = TxOut2: Locking Script | | | | | $x_{20}$ |

In this embodiment, in the first round of pruning, the Unlocking Script element and the Unlocking Script Size element of each input (TxIn) of the transaction form a pruned data set, and the Locking Script element and the Locking Script Size element of each output (TxOut) of the transaction form a pruned data set.

FIG. 3 schematically shows a transaction data set partitioning diagram according to embodiment 1 of the present disclosure.

Table 2 is a table of partitioning reserved data set and the pruned data set for the transaction data set $X^0$ when the first round of pruning is performed on the transaction data set $X^0$, which is as shown in Table 2.

As shown in Table 2, in conjunction with the diagram 300 of FIG. 3, the pruning process for the transaction data set in this embodiment is represented by the formula:

$W_1^0=\{x_7,x_8\}, W_2^0=\{x_{12},x_{13}\}, W_3^0=\{x_{16},x_{17}\},$
$W_4^0=\{x_{19},x_{20}\}$ $S^0=X^0\setminus(W_1^0\cup W_2^0\cup W_3^0\cup W_4^0)$, i.e.,
$W_1^0\cup W_2^0\cup W_3^0\cup W_4^0\cup S^0=X^0$, $X^1=S_0\cup\{\text{HASH}(\text{bin}W_1^0),\text{HASH}(\text{bin}W_2^0),\text{HASH}(\text{bin}W_3^0),\text{HASH}(\text{bin}W_4^0)\}$.

In this embodiment, when a node or a contract needs to verify the authenticity of TxIn1:TXID and TxIn1:VOUT data of the transaction provided by other nodes or users, it only needs to associate the transaction identification number TXID of the transaction with data in the set $\{x_1, x_2, x_3, x_4,$ HASH (bin$W_1^0$), $x_9, x_{10}, x_{11}$, HASH (bin $W_2^0$), $x_{14}, x_{15}$, HASH (bin $W_3^0$), $x_{18}$, HASH (bin $W_4^0$)$\}$, that is, it can verify whether the provided data is actually corresponding data in the transaction through hash calculation; in this process, both the Unlocking Script and Unlocking Script Size original data of the all inputs and the Locking Script and Locking Script Size original data of the all outputs can be pruned, so as to achieve the purpose of reducing data.

In this embodiment, when a node or a contract needs to verify the authenticity of TxOut1:locking Script data of the transaction provided by another node or a user, it only needs to associate the transaction identification number TXID of the transaction with data in the set $\{x_1, x_2, x_3, x_4, x_5, x_6,$ HASH(bin $W_1^0$), $x_9, x_{10}, x_{11}$, HASH (bin $W_2^0$), $x_{14}, x_{15}, x_{18}$, HASH (bin $W_4^0$)$\}$, that is, it can verify whether the provided data is actually corresponding data in the transaction through hash calculation. In this process, both the Unlocking Script and Unlocking Script Size original data of the all inputs and the Locking Script and Locking Script Size original data of the second output can be pruned, so as to achieve the purpose of reducing data.

In this embodiment, when a node needs to multiplex TxOut1:Locking Script data, the data may be stored using a hash pointer HASH(bin$W_3^0$), and when other transactions also have the same Locking Script data, the data pointed by the hash pointer may be shared.

It should be noted that, in this embodiment, the verification of other data may be performed by providing necessary verification data by using the above method, so as to fully reduce the size of the data, and specific details will not be repeated here.

Embodiment 2

In this embodiment, the second round of pruning is performed on the transaction data set $X^0$ based on Table 1, and in the process of pruning, a reserved data set S and a pruned data set W are partitioned as shown in Table 3 below and FIG. 4.

In this embodiment, in the first round of pruning, the Unlocking Script element and the Unlocking Script Size element of each input (TxIn) of the transaction form a pruned data set, and the Locking Script element and the Locking Script Size element of each output (TxOut) of the transaction form a pruned data set.

In this embodiment, in the second round of pruning, the data elements related to the content of any one transaction input belong to the same pruned data set, and the data elements related to the content of any one transaction output belong to another same pruned data set, for example:

$f_1=\text{HASH}(\text{bin}x'), x'\in R(f_1)$ $f_2=\text{HASH}\{\text{bin}(f_1\cup A_1)\}, f_1\in R(f_2), R(f_2)=f_1\cup A_1$ $f_3=\text{HASH}\{\text{bin}(f_2\cup A_2)\}, f_2\in R(f_3), R(f_3)=f_2\cup A_2$ $f_k=\text{HASH}\{\text{bin}(f_{k-1}\cup A_{k-1})\}, f_{k-1}\in R(f_k), R(f_k)=f_{k-1}\cup A_{k-1}$ where $A_j$ is a set or an empty set containing any data element, and $f_i$ represents a hash value, where $1\leq j\leq k$; $R(f_j)$ represents an original image of the hash value $f_j$, and the original image is a data set or a character string set; then, when x' is the data element in any one transaction input, x', $f_1, f_2, f_3, \ldots, f_k$ all are the data elements related to the content of the transaction input; when x' is the data element in the any one transaction output, x', $f_1, f_2, f_3, \ldots, f_k$ all are data elements related to the content of the transaction output.

Specifically, in this embodiment, in the second round of pruning, two pruning data sets are set, wherein $W_1^1$ is used for accommodating data elements related to the content of any one transaction input, and $W_2^1$ is used for accommodating data elements related to the content of any one transaction output.

In a specific implementation, in any one of the second round and above of pruning, two pruned data sets are set, wherein one data set is used for accommodating data elements related to the content of any one transaction input, and the other is used for accommodating data elements related to the content of any one transaction output. Therefore, redundant data may be reduced through the first layer of pruning, and through the partition of the second layer and above of two prunable data sets, input related data and output related data are processed separately, the situation that the prunable data sets are excessively partitioned is avoided, and data tracing is further facilitated.

TABLE 3

| $X^0$ | $S^0$ | $W_1^0$ | $W_2^0$ | $W_3^0$ | $W_4^0$ | $X_1 = Y_0$ | $S^1$ | $W_1^1$ | $W_2^1$ |
|---|---|---|---|---|---|---|---|---|---|
| $x_1$ | $x_1$ | | | | | $x_1$ | $x_1$ | | |
| $x_2$ | $x_2$ | | | | | $x_2$ | $x_2$ | | |
| $x_3$ | $x_3$ | | | | | $x_3$ | $x_3$ | | |
| $x_4$ | $x_4$ | | | | | $x_4$ | $x_4$ | | |
| $x_5$ | $x_5$ | | | | | $x_5$ | | $x_5$ | |
| $x_6$ | $x_6$ | | | | | $x_6$ | | $x_6$ | |
| $x_7$ | | $x_7$ | | | | HASH(bin$W_1^0$) | | HASH(bin$W_1^0$) | |
| $x_8$ | | $x_8$ | | | | | | | |
| $x_9$ | $x_9$ | | | | | $x_9$ | | $x_9$ | |
| $x_{10}$ | $x_{10}$ | | | | | $x_{10}$ | | $x_{10}$ | |

TABLE 3-continued

| $X^0$ | $S^0$ | $W^0_1$ | $W^0_2$ | $W^0_3$ | $W^0_4$ | $X_1 = Y_0$ | $S^1$ | $W^1_1$ | $W^1_2$ |
|---|---|---|---|---|---|---|---|---|---|
| $x_{11}$ | $x_{11}$ | | | | | $x_{11}$ | | $x_{11}$ | |
| $x_{12}$ | | | $x_{12}$ | | | $HASH(binW^0_2)$ | | $HASH(binW^0_2)$ | |
| $x_{13}$ | | | $x_{13}$ | | | | | | |
| $x_{14}$ | $x_{14}$ | | | | | $x_{14}$ | | $x_{14}$ | |
| $x_{15}$ | $x_{15}$ | | | | | $x_{15}$ | | | $x_{15}$ |
| $x_{16}$ | | | | $x_{16}$ | | $HASH(binW^0_3)$ | | | $HASH(binW^0_3)$ |
| $x_{17}$ | | | | $x_{17}$ | | | | | |
| $x_{18}$ | $x_{18}$ | | | | | $x_{18}$ | | | $x_{18}$ |
| $x_{19}$ | | | | | $x_{19}$ | $HASH(binW^0_4)$ | | | $HASH(binW^0_4)$ |
| $x_{20}$ | | | | | $x_{20}$ | | | | |

Figure 4:
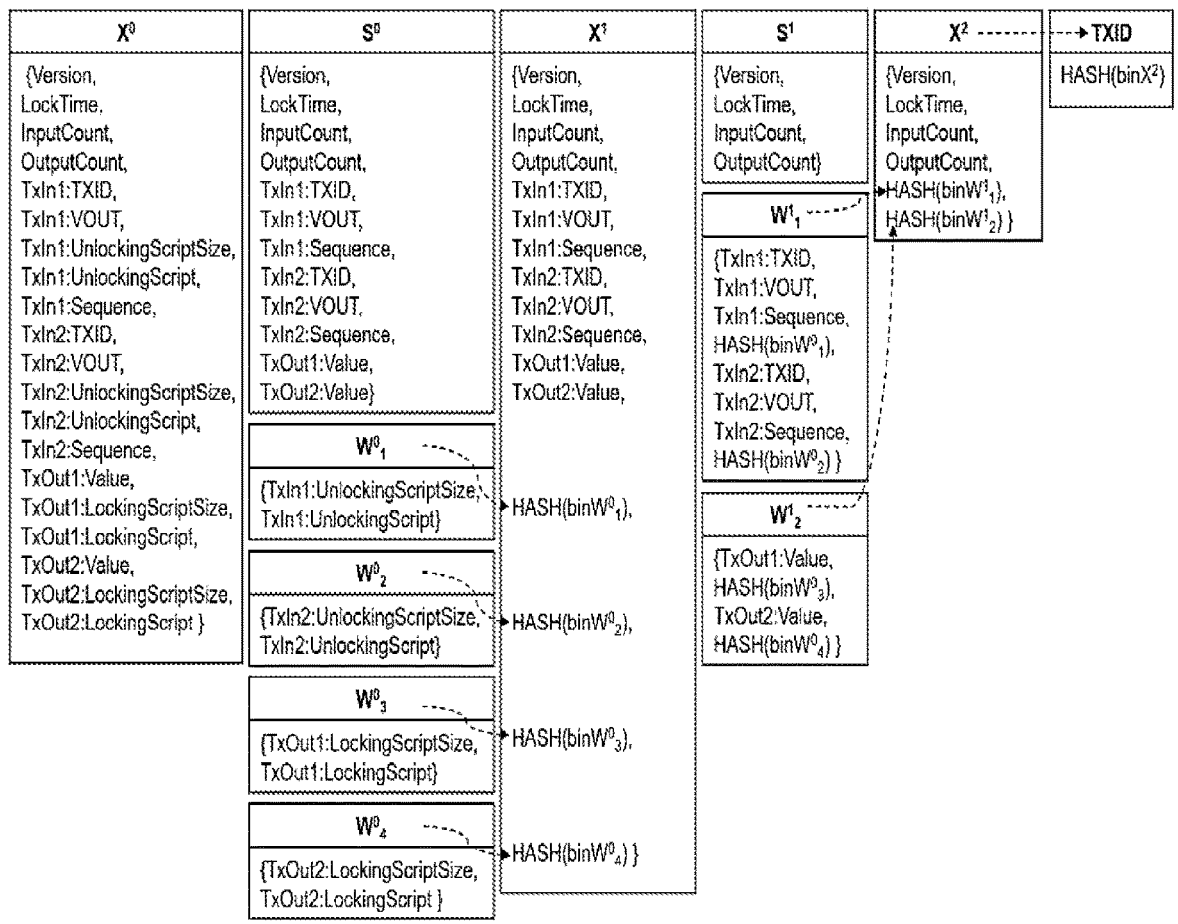
FIG. 4 schematically shows a transaction data set partitioning diagram according to embodiment II of the present disclosure.

FIG. 4 schematically shows a transaction data set partitioning diagram according to embodiment II of the present disclosure.

Table 3 is a table of partitioning reserved data set and the pruned data set for the transaction data set $X^0$ when the second round of pruning is performed on the transaction data set $X^0$, which is as shown in Table 3.

As shown in Table 3, in conjunction with the diagram 400 of FIG. 4, the pruning process for the transaction data set in this embodiment is represented by the formula:

$W_1^0=\{x_7,x_8\}, W_2^0=\{x_{12},x_{13}\}, W_3^0=\{x_{16},x_{17}\},$
$W_4^0=\{x_{19},x_{20}\},$ $S^0=X^0\backslash(W_1^0\cup W_2^0\cup W_3^0\cup W_4^0).$ $X^1=S^0\cup\{HASH(binW_1^0), HASH(binW_2^0), HASH(binW_3^0), HASH(binW_4^0)\}.$ $W_1^1=\{x_5,x_6, HASH(binW_1^0), x_9, x_{10}, x_{11}, HASH(binW_2^0), x_{14}\},$ $W_2^1=\{x_{15}, HASH(binW_3^0), x_{18}, HASH(binW_4^0)\},$ $S^1=\{x_1,x_2,x_3,x_4\},$ $X^2=S^1\cup\{HASH(binW_1^1), HASH(binW_2^1)\}.$ In this embodiment, when a node or a contract needs to verify the authenticity of TxIn1:TXID and TxIn1:VOUT data of the transaction provided by another node or a user, it only needs to associate the transaction identification number TXID of the transaction with data in the set $\{x_1, x_2, x_3, x_4, HASH(binW_1^0), x_9, x_{10}, x_{11}, HASH(binW_2^0), x_{14}, HASH(binW_2^1)\}$, that is, it can verify whether the provided data is actually corresponding data in the transaction through hash calculation. In this process, both the Unlocking Script and Unlocking Script Size original data of the all inputs and all output data can be pruned, so as to achieve the purpose of reducing data.

In this embodiment, when a node or a contract needs to verify the authenticity of TxOut1:locking Script data of the transaction provided by another node or a user, it only needs to associate the transaction identification number TXID of the transaction with data in the set $\{x_1, x_2, x_3, x_4, HASH(binW_1^1), x_{15}, x_{18}, HASH(binW_4^0)\}$, that is, it can verify whether the provided data is actually corresponding data in the transaction through hash calculation. In this process, both original data of all inputs and the Locking Script and Locking Script Size original data of the second output can be pruned, so as to achieve the purpose of reducing data.

In this embodiment, when a node needs to multiplex TxOut1:Locking Script data, the data may be stored using a hash pointer HASH (bin $W_3^0$), and when other transactions also have the same Locking Script data, the data pointed by the hash pointer may be shared.

In this embodiment, after a node or a contract has determined that the hash value of datum is HASH (bin $W_2^1$), because the data segment in the data representing each output has the same byte length, the data can be further partitioned into two parts, i.e., the front part and the back part, with the same number of bytes, and then the encoded value of the front part of data is conveniently and safely determined as {TxOut1:Value, HASH (bin$W_3^0$)}, and the encoded value of the back part of data is {TxOut2:Value, HASH (bin$_4^0$)}, and then corresponding data can be obtained through decoding.

It should be noted that, in this embodiment, the verification of other data may be performed by providing necessary verification data by using the above method, so as to fully reduce the size of the data, and specific details will not be repeated here.

Embodiment 3

In this embodiment, the second round of pruning is performed on the transaction data set X0 based on Table 1.

In this embodiment, the measurement elements in the transaction data include an element representing the byte length of a certain element in the transaction data and a count element representing the number of a certain type of element in the transaction data, and are not pruned together with the target elements to be measured. In a specific implementation, an Unlocking Script Size element in each transaction input data does not belong to the same pruned data set as an Unlocking Script element, a Locking Script Size element in each transaction output data does not belong to the same pruned data set as a Locking Script element, an InputCount element does not belong to the same pruned data set as TXID in all transaction input data, and an OutputCount element does not belong to the same pruned data set as a Value element in all output transaction data.

Specifically, in this embodiment, in the first layer of pruning, the Unlocking Script element of each input (TxIn) of the transaction forms a separate prunable data set, and the Locking Script element of each output (TxOut) of the transaction forms a separate prunable data set.

TABLE 4

| $X^0$ | $S^0$ | $W^0_1$ | $W^0_2$ | $W^0_3$ | $W^0_4$ | $X_1 = Y_0$ | $S^1$ | $W^1_1$ | $W^1_2$ |
|---|---|---|---|---|---|---|---|---|---|
| $x_1$ | $x_1$ | | | | | $x_1$ | $x_1$ | | |
| $x_2$ | $x_2$ | | | | | $x_2$ | $x_2$ | | |
| $x_3$ | $x_3$ | | | | | $x_3$ | $x_3$ | | |
| $x_4$ | $x_4$ | | | | | $x_4$ | $x_4$ | | |
| $x_5$ | $x_5$ | | | | | $x_5$ | | $x_5$ | |
| $x_6$ | $x_6$ | | | | | $x_6$ | | $x_6$ | |
| $x_7$ | $x_7$ | | | | | $x_7$ | | $x_7$ | |
| $x_8$ | | $x_8$ | | | | $HASH(binW^0_1)$ | | $HASH(binW^0_1)$ | |
| $x_9$ | $x_9$ | | | | | $x_9$ | | $x_9$ | |
| $x_{10}$ | $x_{10}$ | | | | | $x_{10}$ | | $x_{10}$ | |
| $x_{11}$ | $x_{11}$ | | | | | $x_{11}$ | | $x_{11}$ | |
| $x_{12}$ | $x_{12}$ | | | | | $x_{12}$ | | $x_{12}$ | |
| $x_{13}$ | | | $x_{13}$ | | | $HASH(binW^0_2)$ | | $HASH(binW^0_2)$ | |
| $x_{14}$ | $x_{14}$ | | | | | $x_{14}$ | | $x_{14}$ | |
| $x_{15}$ | $x_{15}$ | | | | | $x_{15}$ | | | $x_{15}$ |
| $x_{16}$ | $x_{16}$ | | | | | $x_{16}$ | | | $x_{16}$ |
| $x_{17}$ | | | | $x_{17}$ | | $HASH(binW^0_3)$ | | | $HASH(binW^0_3)$ |
| $x_{18}$ | $x_{18}$ | | | | | $x_{18}$ | | | $x_{18}$ |
| $x_{19}$ | $x_{19}$ | | | | | $x_{19}$ | | | $x_{19}$ |
| $x_{20}$ | | | | | $x_{20}$ | $HASH(binW^0_4)$ | | | $HASH(binW^0_4)$ |

In the pruning process in Embodiment 3, the partition of the reserved data set S and the pruned data set W is as shown in Table 4 below and FIG. 5.

Figure 5:
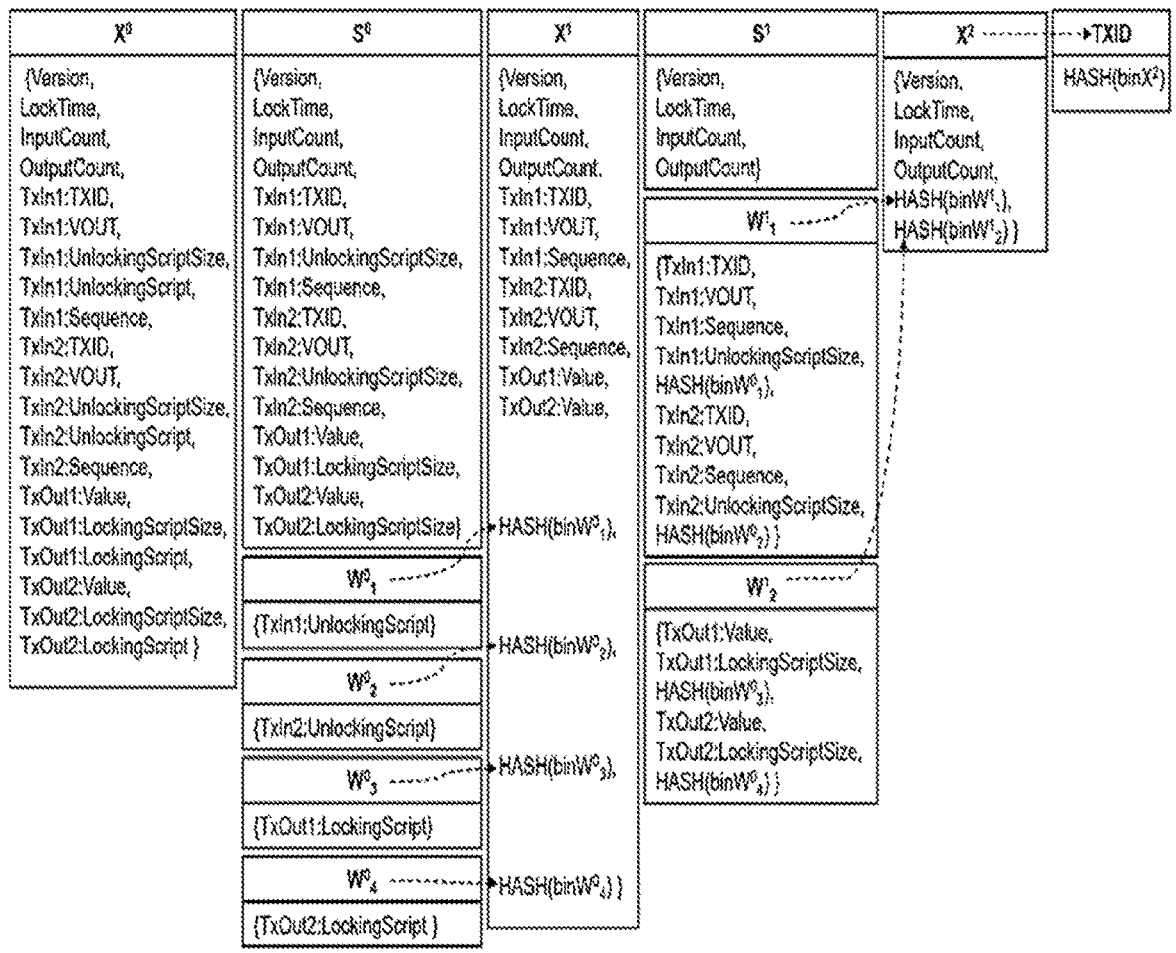
FIG. 5 schematically shows a transaction data set partitioning diagram according to embodiment III of the present disclosure.

FIG. 5 schematically shows a transaction data set partitioning diagram according to a third embodiment of the present disclosure.

Table 3 is a table of partitioning reserved data set and the pruned data set for the transaction data set $X^0$ when the second round of pruning is performed on the transaction data set $X^0$, which is as shown in Table 4.

As shown in Table 4, in conjunction with the diagram 500 of FIG. 5, the pruning process for the transaction data set in this embodiment is represented by the formula:

$$W_1^0=\{x_8\}, W_2^0=\{x_{13}\}, W_3^0=\{x_{17}\}, W_4^0=\{x_{20}\},$$

$$S^0=X^0\setminus(W_1^0\cup W_2^0\cup W_3^0\cup W_4^0).$$

$$X^1=S^0\cup\{HASH(binW_1^0), HASH(binW_2^0), HASH(binW_3^0), HASH(binW_4^0)\}$$

$$W_1^1=\{x_5,x_6,x_7,HASH(binW_1^0),x_9,x_{10},x_{11},x_{12},HASH(binW_2^0),x_{14}\},$$

$$W_2^1=\{x_{15},x_{16},HASH(binW_3^0),x_{18},x_{19},HASH(binW_4^0)\},$$

$$S^1=\{x_1,x_2,x_3,x_4\},$$

$$X^2=S^1\cup\{HASH(binW_1^1),HASH(binW_2^1)\}.$$

In this embodiment, when a node or a contract needs to verify the authenticity of TxIn1:TXID and TxIn1:VOUT data of the transaction provided by another node or a user, it only needs to associate the transaction identification number TXID of the transaction with data in the set $\{x_1, x_2, x_3, x_4, x_7$. $HASH(bin\ W_1^0)$, $x_9$, $x_{10}$, $x_{11}$, $x_{12}$, $HASH(binW_2^0)$, $x_{14}$, $HASH(binW_2^1)\}$, that is, it can verify whether the provided data is actually corresponding data in the transaction through hash calculation. In this process, both the Unlocking Script original data of the all inputs and all output data can be pruned, so as to achieve the purpose of reducing data.

In this embodiment, when a node or a contract needs to verify the authenticity of TxOut1:Locking Script data of the transaction provided by another node or a user, it only needs to associate the transaction identification number TXID of the transaction with data in the set $\{x_1, x_2, x_3, x_4, HASH(bin\ W_1^1)$, $x_{15}$, $x_{16}$, $x_{18}$, $x_{19}$, $HASH(binW_4^0)\}$, that is, it can verify whether the provided data is actually corresponding data in the transaction through hash calculation. In this process, both original data of all inputs and the Locking Script and Locking Script Size original data of the second output can be pruned, so as to achieve the purpose of reducing data.

In this embodiment, when a node needs to multiplex TxOut1:Locking Script data, the data may be stored using a hash pointer $HASH(binW^0_3)$, and when other transactions also have the same Locking Script data, the data pointed by the hash pointer may be shared.

It should be noted that, in this embodiment, the verification of other data may be performed by providing necessary verification data by using the above method, so as to fully reduce the size of the data, and specific details will not be repeated here.

It should be further noted that, in the embodiments of the present disclosure, the schemes of the present disclosure are only further described by way of the above embodiments, and are not intended to limit the scope of the present disclosure.

Based on the method for hierarchically pruning data in a blockchain transaction, the present disclosure further provides an apparatus for hierarchically pruning data in a blockchain transaction.

Figure 6:
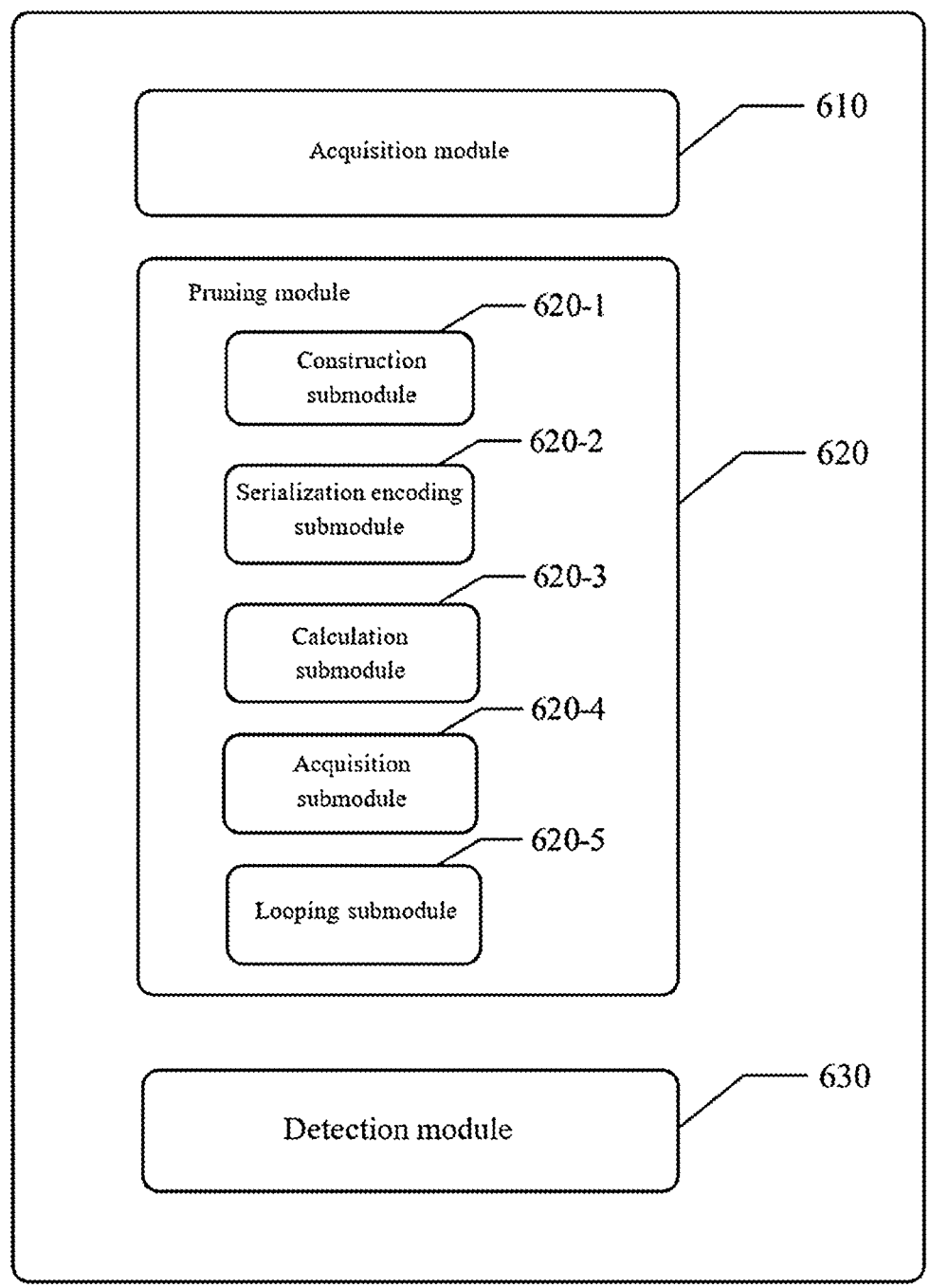
FIG. 6 is a block diagram schematically illustrating the structure of an apparatus for hierarchically pruning data in a blockchain transaction according to an embodiment of the present disclosure.

FIG. 6 is a block diagram schematically illustrating the structure of an apparatus for hierarchically pruning data in a blockchain transaction according to an embodiment of the present disclosure.

As shown in FIG. 6, the apparatus 600 includes: an acquisition module 610, a pruning module 620 and a processing module 630.

The acquisition module 610 is configured to acquire a transaction data set.

The pruning module 620 is configured to perform N rounds of pruning on the transaction data set based on a data pruning model to obtain a target data set, where N is a positive integer greater than or equal to 1.

The processing module 630 is configured to perform processing on the target data set to obtain a target value, wherein the target value is configured as the transaction identification number used when the target data set is on-chain.

According to an embodiment of the present disclosure, the pruning module 620 may include: a construction submodule 620-1, a serialization encoding submodule 620-2, a calculation submodule 620-3, an acquisition submodule 620-4, and a looping submodule 620-5.

The construction submodule 620-1 is configured to construct a reserved data set and M pruned data sets configured by using the transaction data set, where M is a positive integer greater than or equal to 1.

The serialization encoding submodule 620-2 is configured to perform first serialization encoding on the pruned data set to obtain a first serialization encoded value corresponding to the pruned data set.

The calculation submodule 620-3 is configured to perform hash calculation on the first serialization encoded value to obtain a first hash value corresponding to the first serialization encoded value.

The acquisition submodule 620-4 is configured to construct a first hash value set by M first hash values corresponding to first serialization encoded values, and merge the first hash value set with the reserved data set to obtain an intermediate transaction data set.

The looping submodule 620-5 is configured to repeatedly executing operations corresponding to the above submodules by using the intermediate transaction data set until the intermediate transaction data set satisfies a predetermined condition to obtain the target data set.

According to an embodiment of the present disclosure, any plurality of the acquisition module 610, the pruning module 620 and the processing module 630 may be combined and implemented in one module, or any one of the modules may be split into a plurality of modules. Alternatively, at least part of the functions of one or more of these modules may be combined with at least part of the functions of other modules and implemented in one module. According to an embodiment of the present disclosure, at least one of the acquisition module 610, the pruning module 620 and the processing module 630 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented in hardware or firmware by any other reasonable way of integrating or packaging a circuit, or in any one of three implementations of software, hardware and firmware, or in a suitable combination of any of the above. Alternatively, at least one of the acquisition module 610, the pruning module 620 and the processing module 630 may be implemented at least partially as a computer program module that, when executed, may perform corresponding functions.

Figure 7:
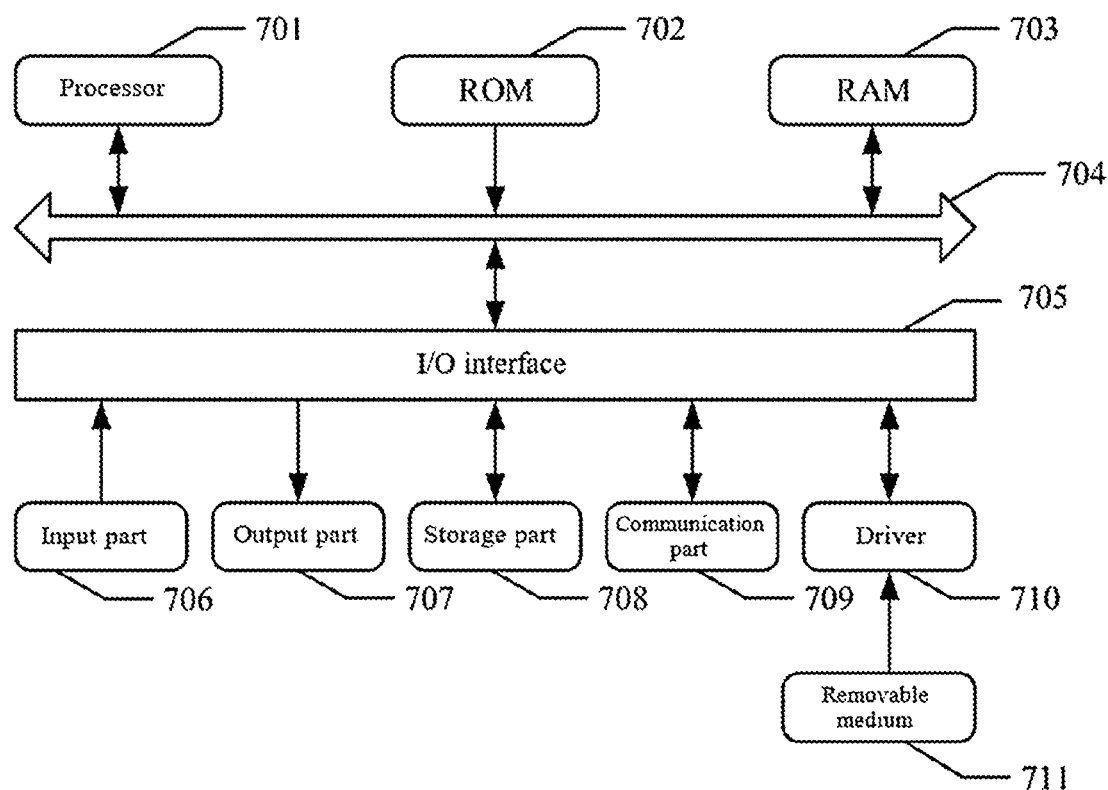
FIG. 7 is a block diagram schematically illustrating an electronic device adapted to implement a method for hierarchically pruning data in a blockchain transaction according to an embodiment of the present disclosure.

FIG. 7 is a block diagram schematically illustrating an electronic device adapted to implement a method for hierarchically pruning data in a blockchain transaction according to an embodiment of the present disclosure.

As shown in FIG. 7, an electronic device 700 according to an embodiment of the present disclosure includes a processor 701, which can perform various appropriate operations and processes according to a program stored in a read only memory (ROM) 702 or a program loaded from a storage part 708 into a random access memory (RAM) 703. The processor 701 may include, for example, a general-purpose microprocessor (e.g., a CPU), an instruction set processor and/or related chipset, and/or a special-purpose microprocessor (e.g., an application specific integrated circuit (ASIC)). The processor 701 may further include on-board memory for caching. The processor 701 may include a single processing unit or a plurality of processing units for performing the different operations of the method flows according to embodiments of the present disclosure.

In the RAM 703, various programs and data required by the operation of the electronic device 700 are stored. The processor 701, the ROM 702 and the RAM 703 are connected to each other by a bus 704. The processor 701 performs various operations of the method flows according to the embodiments of the present disclosure by executing programs in the ROM 702 and/or the RAM 703. It should be noted that the program may also be stored in one or more memories other than the ROM 702 and the RAM 703. The processor 701 may also perform various operations of method flows according to embodiments of the present disclosure by executing programs stored in the one or more memories.

According to an embodiment of the present disclosure, the electronic device 700 may further include input/output (I/O)) interface 705, wherein the input/output (I/O) interface 705 also connects to bus 704. The electronic device 700 may further include one or more of the following components connected to the I/O interface 705: an input part 706 including a keyboard, a mouse and the like; an output part 707 including components such as a cathode ray tube (CRT), a liquid crystal display (LCD) and a speaker; a storage part 708 including a hard disk and the like; and a communication part 709 including a network interface card such as an LAN card, a modem and the like. The communication part 709 performs communication processing via a network such as the Internet. A drive 710 is also connected to the I/O interface 705 as needed. A removable medium 711 such as a magnetic disk, an optical disk, a magneto-optical disk or a semiconductor memory is mounted on the drive 710 as needed, so that the computer program read out therefrom is mounted in the storage part 708 as needed.

The present disclosure further provides a computer-readable storage medium, which may be included in the device/apparatus/system described in the above embodiments; or may exist alone without being assembled into the device/apparatus/system. The computer-readable storage medium carries one or more programs which, when executed, implement the method according to an embodiment of the present disclosure.

According to an embodiment of the present disclosure, the computer-readable storage medium may be a non-volatile computer-readable storage medium, which may include, for example, but is not limited to: a portable computer diskette, a hard disk, a random access memory (RAM), a read-only memory (ROM), an erasable programmable read-only memory (EPROM or flash memory), a portable compact disc read-only memory (CD-ROM), an optical storage apparatus, a magnetic storage apparatus, or any suitable combination of the above. In the present disclosure, the computer-readable storage medium can be any tangible medium containing or storing a program capable of being used by or in connection with an instruction execution system, apparatus or device. For example, according to an embodiment of the present disclosure, the computer-readable storage medium may include the above ROM 702 and/or RAM 703 and/or one or more memories other than the ROM 702 and RAM 703.

Embodiments of the present disclosure also include a computer program product including a computer program containing program code for performing the method illustrated by the flow chart. When the computer program product runs in a computer system, the program code is used for causing the computer system to implement the item recommendation method provided by the embodiments of the present disclosure.

The computer program, when executed by the processor 701, performs the functions as defined in the aforementioned system/apparatus. According to an embodiment of the present disclosure, the above described system, apparatus, module, unit and the like may be implemented by computer program modules.

In one embodiment, the computer program may be hosted on a tangible storage medium such as an optical storage apparatus, or a magnetic storage apparatus. In another embodiment, the computer program may also be transmitted in the form of a signal over a network medium, distributed, and downloaded and installed via the communication part 709, and/or installed from the removable medium 711. The program codes contained in the computer program can be transmitted by any appropriate network medium, including but not limited to: wireless, wired networks and the like, or any appropriate combination of the above.

In such an embodiment, the computer program may be downloaded and installed from a network through the communication part 709, and/or installed from the removable medium 711. The computer program, when executed by the processor 701, performs the above functions defined in the system of the embodiments of the present disclosure. According to an embodiment of the present disclosure, the above described system, device, apparatus, module, unit and the like may be implemented by computer program modules.

According to an embodiment of the present disclosure, the program code for executing computer programs provided by embodiments of the present disclosure may be written in any combination of one or more programming languages, and in particular, these computer programs may be implemented using high level procedural and/or object oriented programming languages, and/or assembly/machine languages. The programming language includes, but is not limited to, programming languages such as Java, Rust, C++, python and "C" language. The program code may execute entirely on the user's computing device, partly on the user's device, partly on a remote computing device, or entirely on the remote computing device or server. In the situations of remote computing device, the remote computing device may be connected to the user computing device through any type of network, including a local area network (LAN) or a wide area network (WAN), or may be connected to an external computing device (e.g., through the Internet using an Internet service provider).

The flow charts and block diagrams in the figures illustrate the implementable system architecture, function and operation of system, method and computer program product according to various embodiments of the present disclosure. In this regard, each block in the flow charts or the block diagrams can represent a portion of a module, a program segment or codes, wherein the portion of the module, the program segment or the codes includes one or more executable instructions for implementing specified logical functions. It should also be noted that, in some alternative implementations, the functions shown in the blocks occur in an order different from the order shown in the drawings. For example, two blocks shown in succession may, in fact, be executed substantially in parallel, and the two blocks may sometimes be executed in a reverse order, depending upon the functions involved. It should also be noted that each block of the block diagrams or the flow charts and a combination of the blocks in the block diagrams or the flow charts can be implemented through a dedicated hardware-based system that executes a specified function or operation, or can be implemented through a combination of a dedicated hardware and a computer instruction.

It should be understood by those skilled in the art that various combinations or/and conjunctions of features recited in the various embodiments of the present disclosure and/or in the claims may be made, even if such combinations or conjunctions are not explicitly recited in the present disclosure. In particular, various combinations and/or conjunctions of the features recited in the various embodiments of the present disclosure and/or the claims may be made without departing from the spirit and teachings of the present disclosure. All these combinations and/or conjunctions are within the scope of the present disclosure.

The embodiments of the present disclosure are described above. However, these embodiments are for illustrative purposes only and are not intended to limit the scope of the present disclosure. Although the embodiments are described separately above, this does not mean that the measures in the embodiments cannot be used advantageously in combination. The scope of the present disclosure is defined by the appended claims and equivalents thereof. Various alternatives and modifications can be made by those skilled in the art without departing from the scope of the present disclosure, and these alternatives and modifications are intended to fall within the scope of the present disclosure.

What is claimed is:

1. A method for hierarchically pruning data in a blockchain transaction, comprising:

acquiring a transaction data set;

performing N rounds of pruning on the transaction data set based on a data pruning model to obtain a target data set, wherein N is a positive integer greater than or equal to 1;

performing processing on the target data set to obtain a target value, wherein the target value is configured as the transaction identification number used when the target data set is on-chain;

wherein the performing N rounds of pruning on the transaction data set based on a data pruning model to obtain a target data set comprises:

S1, constructing a reserved data set and M pruned data sets by using the transaction data set, where M is a positive integer greater than or equal to 1;

S2, performing first serialization encoding on the pruned data set to obtain a first serialization encoded value corresponding to the pruned data set:

S3, performing hash calculation on the first serialization encoded value to obtain a first hash value corresponding to the first serialization encoded value:

S4, constructing a first hash value set by M first hash values corresponding to first serialization encoded values, and merging the first hash value set with the reserved data set to obtain an intermediate transaction data set; and S5, repeatedly executing operations S1-S4 by using the intermediate transaction data set until the intermediate transaction data set satisfies a predetermined condition to obtain the target data set.

2. The method according to claim 1, wherein the data set pruned by the data pruning model is represented by:

$$Y = S \cup \{HASH(binW1), HASH(binW2), \ldots, HASH(binWM)\},$$

where S is a reserved data set in an input data set X: W1, W2, ..., WM are pruned data sets in the input data set X; M is the number of the pruned data sets; binWM is a serialization encoded value of the pruned data set WM; HASH(binWM) is a hash value of the binWM; Y is a data set obtained after the input data set X is pruned by the data pruning model; X={x1, x2, x3, ..., xa}, S={S1, S2, S3, ..., Sb}, Wh={Wh,1, Wh,2, Wh,3, ..., Wh,$c_h$}, Wh is any one of the pruned data sets W1, W2, ..., WM; a is the number of data elements in the input data set X, and x1, x2, x3, ..., xa are the data elements in the input data set X; b is the number of data elements in the reserved data set S, and s1, s2, s3, ..., sb are the data elements in the reserved data set S; h is the number of the pruned data sets, where $1 \leq h \leq M$: Ch is the number of data elements in the pruned data set Wh, where $Ch \geq 1$, and Wh,1, Wh,2, Wh,3, ..., Wh,$c_h$ are data elements in the pruned data set $W_h$.

3. The method according to claim 1, wherein the performing processing on the target data set to obtain a target value comprises:
   performing second serialization encoding on the target data set to obtain a second serialization encoded value corresponding to the target data set; and
   performing hash calculation on the second serialization encoded value to obtain a target value.

4. The method according to claim 1, wherein the reserved data set in a first round of pruning is a non-empty data set.

5. The method according to claim 1, wherein when the method is applied to a distributed ledger under a UTXO model, in the case of a first round of pruning, an Unlocking Script element in each transaction input data in the transaction data set forms a separate pruned data set.

6. The method according to claim 5, wherein in the case of jth round of pruning, data elements related to the Unlocking Script elements in the each transaction input data all belong to the same pruned data set, where $2 \leq j \leq N$.

7. The method according to claim 1, wherein when the method is applied to a distributed ledger under a UTXO model, in the case of a first round of pruning, a Locking Script element in each transaction output data in the transaction data set forms a separate pruned data set.

8. The method according to claim 6, wherein in the case of the jth round of pruning, data elements related to the Locking Script elements in the each transaction output data all belong to the same pruned data set, where $2 \leq j \leq N$.

9. An apparatus for hierarchically pruning data in a blockchain transaction, comprising:
   an acquisition module, configured to acquire a transaction data set;
   a pruning module, configured to perform N rounds of pruning on the transaction data set based on a data pruning model to obtain a target data set, wherein N is a positive integer greater than or equal to 1;
   a processing module, configured to perform processing on the target data set to obtain a target value, wherein the target value is configured as the transaction identification number used when the target data set is on-chain;
   wherein the pruning module comprises:
   a construction submodule, configured to construct a reserved data set and M pruned data sets configured by using the transaction data set, where M is a positive integer greater than or equal to 1;
   a serialization encoding submodule, configured to perform first serialization encoding on the pruned data set to obtain a first serialization encoded value corresponding to the pruned data set;
   a calculation submodule, configured to perform hash calculation on the first serialization encoded value to obtain a first hash value corresponding to the first serialization encoded value;
   an acquisition submodule, configured to construct a first hash value set by M first hash values corresponding to first serialization encoded values, and merge the first hash value set with the reserved data set to obtain an intermediate transaction data set; and
   a looping submodule, configured to repeatedly executing operations corresponding to the above submodules by using the intermediate transaction data set until the intermediate transaction data set satisfies a predetermined condition to obtain the target data set.

10. An electronic device, comprising:
    one or more processors; and
    a storage apparatus, configured to store one or more programs,
    wherein the one or more programs, when executed by the one or more processors, cause the one or more processors to perform the method according to claim 1.

11. An electronic device, comprising:
    one or more processors; and
    a storage apparatus, configured to store one or more programs,
    wherein the one or more programs, when executed by the one or more processors, cause the one or more processors to perform the method according to claim 6.

12. An electronic device, comprising:
    one or more processors; and
    a storage apparatus, configured to store one or more programs,
    wherein the one or more programs, when executed by the one or more processors, cause the one or more processors to perform the method claim 7.

13. A computer-readable storage medium having executable instructions stored thereon, wherein the instructions, when executed by a processor, cause the processor to perform the method according to claim 1.

14. A computer-readable storage medium having executable instructions stored thereon, wherein the instructions, when executed by a processor, cause the processor to perform the method according to claim 7.

15. A computer-readable storage medium having executable instructions stored thereon, wherein the instructions, when executed by a processor, cause the processor to perform the method according to claim 8.

16. A computer program product comprising a computer program, wherein the computer program, when executed by a processor, implements the method according to claim 1.

17. A computer program product comprising a computer program, wherein the computer program, when executed by a processor, implements the method according to claim 7.

18. A computer program product comprising a computer program, wherein the computer program, when executed by a processor, implements the method according to claim 8.

* * * * *